United States Patent [19]

Finch

[11] 3,755,788

[45] Aug. 28, 1973

[54] DATA RECIRCULATOR

[75] Inventor: DeVer Charles Finch, Phoenix, Ariz.

[73] Assignee: Honeywell Information Systems Inc., Waltham, Mass.

[22] Filed: May 1, 1972

[21] Appl. No.: 249,298

[52] U.S. Cl. .............................................. 340/172.5
[51] Int. Cl. ......................... G11c 19/00, G11c 21/00
[58] Field of Search .................................. 340/172.5

[56] References Cited

UNITED STATES PATENTS

| | | | |
|---|---|---|---|
| 3,277,447 | 10/1966 | Newman et al. | 340/172.5 |
| 3,588,833 | 6/1971 | Bartlett et al. | 340/172.5 |
| 3,602,901 | 8/1971 | Dixson | 340/172.5 |
| 3,387,275 | 6/1968 | Gooding et al. | 340/172.5 |
| 3,237,168 | 2/1966 | Hertz | 340/172.5 |

*Primary Examiner*—Gareth D. Shaw
*Attorney*—Edward W. Hughes, Edward A. Gerlaugh et al.

[57] ABSTRACT

An improved recirculating memory emulates a sonic or a glass delay line unit by providing a recirculating device and data item location addressing means.

5 Claims, 5 Drawing Figures

DATA RECIRCULATOR

BACKGROUND OF THE INVENTION

This invention relates to the storage of digital information in data recirculators and, more particularly, to simplified apparatus for emulating a mechanical delay line and providing apparently dynamic storage of information bits in a delay line.

In order to function, electronic digital computers and associated equipments comprising a data processing system must include a variety of means to store information temporarily. Information is normally stored in the binary code or in a binary coded representation of alphanumeric characters. A binary digit may be stored statically in such devices as the well known bistable multivibrator, magnetic core, etc. Bits may also be stored dynamically in a mechanical delay line. One broad category of mechanical delay lines utilized for the temporary storage of digital information is the glass or quartz delay line. Another is the sonic delay line, so called because an electrical signal representing information to be stored is converted into a mechanical signal by a transmitting transducer and the signal is propagated as acoustic energy along the delay line at a velocity much slower than electrical energy, thereby affording relatively long delay times. A transducer disposed at the receiving end of the sonic delay line converts the acoustic energy into electrical energy which can be transformed back to digital signals meaningful within the data processing system.

An example of a sonic delay line data recirculator in a data processing system is described in U.S. Pat. No. 3,587,059, assigned to the assignee of the present invention. Another example of a recirculating digital data storage system utilizing a sonic delay line is disclosed in U.S. Pat. No. 3,493,938.

A factor determining the capacity of a given delay line is the rate at which digital information can be introduced into the delay line, the rate affecting the spacing or density of information passing into the delay line. As the input frequency is increased and the spacing between pulses decreases accordingly, the vagaries in transmission time caused by such factors as temperature variations which bring about the change in the physical length of the line, and mechanical shocks, may result in the reading of false information from the delay line. The well-known quartz or glass delay lines are particularly adversely affected by temperature variation. Additionally, small signal variations or spikes which may be generated in the digital circuits associated with the delay line may be passed on to the delay line input circuits. Any such noise spikes will ordinarily be at a much higher frequency than the delay line is designed to operate, consequently, the delay line may accept erroneous data.

It has been common in the past to adjust and test the sonic delay lines on a periodic basis to assure the validity of the retrieved data. Expensive test equipment must be provided for these periodic checks and adjustments. Accordingly, it becomes highly desirable to provide a less expensive means for recirculating binary data in an apparently dynamic manner and in an environment relatively uncontrolled compared with the environmental requirements of the prior art delay lines.

SUMMARY OF THE INVENTION

It is, therefore, an object of my invention to provide improved means for buffering data items in a data processing system.

It is a more specific object of the invention to provide a low-cost, highly stable replacement for a mechanical delay line unit.

It is another object of the invention to provide improved recirculating storage apparatus for buffering data items transferred between a high speed device and a plurality of low-speed devices.

These and other objects in accordance with the invention claimed are achieved by providing location addressable memory devices in combination with a recirculating address counter and a recirculating device selection counter. A particular location, addressed simultaneously in all of the devices is accessed successively in each device. During the access of the location for a particular device, the contents of the location are transferred to the input of a shift register. The output of the other end of the shift register is then transferred to the accessed location for storage therein, overwriting the data previously transferred from the location to the shift register. The device selection counter is then incremented and the addressed location is accessed in the next device. When the common address location has been accessed in all memory devices, the device access counter is reset and the recirculating address counter is incremented. When the appropriate number of data items has been accessed and transferred to the shift register for passage therethrough, both the device selection counter and the recirculating address counter are reset.

BRIEF DESCRIPTION OF THE DRAWINGS

The invention is pointed out with particularity in the appended claims, however, other features of the invention will become more apparent and the invention will be best understood by referring to the following detailed description in conjunction with the accompanying drawings in which:

DETAILED DESCRIPTION OF THE INVENTION

Figure 1:
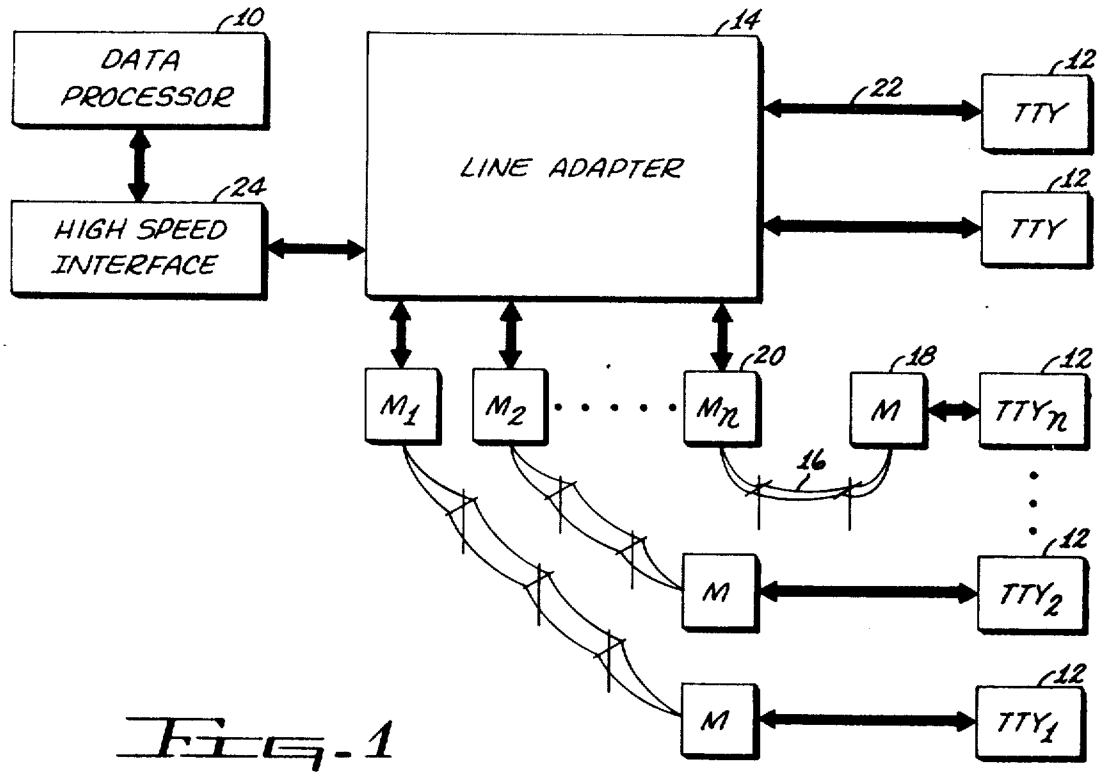
FIG. 1 is a simplified block diagram of a data processing system in which data items are transferred between a high speed device and a plurality of low speed devices.

The present invention relates to the transfer of input and output data in a data processing system. FIG. 1 shows diagrammatically an example of a data communications system employing data processing facilities. As used herein, data communications means the transmission of information to and from data processing equipment and includes the assembly, sequencing, routing and selection of such information as is generated at independent remote points of data origination; and the distribution of the processed information to remote output terminals or other data processing equipment. Various means of communication from one point to another exist today as part of our nation's common and private carrier facilities, viz.: wire lines, cables, radio, and microwave facilities. Since it is believed unnecessary to describe the well-known details of these systems to completely describe the invention, block diagrams will be used where possible. However, even though known details will be eliminated, a basic description of the entire system will be presented to enable one skilled in the art to understand an environment in which the present invention may be placed.

For simplification purposes, it is assumed in FIG. 1 that digital information in binary form is transferred between a data processor 10 and a plurality of low-speed devices 12. The low-speed devices 12 may be, for example, teleprinters or other peripheral input and output devices. Binary information in bit-serial format is transferred between the low-speed devices 12 and a line adapter 14. Data may be transferred via a communications system comprising a telephone line 16 connected to the remote device through a modulator-demodulator (modem) 18, and to the line adapter 14 through another modem 20. The plurality of remote devices, labeled $TTY_1$, $TTY_2$, . . . $TTY_n$, thus communicate with the line adapter 14 through their respective modems, and corresponding modems labeled $M_1$ $M_2$ . . . $M_n$ located near the line adapter 14. Alternately, data may be transferred between the low-speed devices 12 and the line adapter 14 via an interconnecting cable 22 in cases where a particular device is not located remotely from the line adapter 14.

Data originating from the plurality of low-speed devices 12 is collected and buffered in the line adapter 14, and transmitted to the data processor 10 via a high-speed interface 24. Processed data is transferred from the data processor 10 to the plurality of remote devices 12 via the high-speed interface 24 and the line adapter 14. Data transferred from the data processor 10 to the line adapter 14 is buffered in the line adapter and subsequently distributed to the plurality of remote devices 12, as for example, in the manner described in the aforementioned U.S. Pat. No. 3,587,059.

The present invention pertains to the buffering of data transferred between a high-speed device and a plurality of low-speed devices. It should be understood that the scope of the invention extends beyond the illustrative environment described hereinbefore for purposes of explanation, i.e., a data communications environment, and has broad application in the field of input/output devices or controllers.

Before proceeding with the detailed description of the drawings, it is believed desirable to define several terms utilized therin. In the present system, as in any system, the various electrical signals and pulses generated and utilized will be of some particular magnitude. The values of these signals, however, are not germane to the present invention; the values may, in fact, vary from system to system. In the ensuing discussion, therefore, these signals will be described merely as "high level" or "low level," or alternately, enabled or disabled. The term AND-gate as used herein designates a multiple input logic element whose output is enable only when all of its inputs are enabled. A bistable is a device whose output is a function of the last input of the device. The bistables utilized in the implementation of the present invention are of the type which permit changing of the output state only at predetermined times. These bistables generally include three input terminals: a set or S terminal, a reset or R terminal, and a trigger or T terminal; and two output terminals: a 1 terminal and a 0 terminal. If high level signals are supplied simultaneously to the S and T terminals, the 1 otuput terminal of the bistable is at a high level or enabled, and the 0 output terminal is at a low level or disabled. Conversely, if high level signals are applied simultaneously to the R and T terminals of the bistable, the 1 output terminal of the bistable is disabled and the 0 output terminal is enabled. A more detailed description of the logic circuits can be found in Chapter 3 of the textbook "Electronic Digital Components and Circuits" by R. K. Richards, published by D. Van Nostrand Company, Inc., 1967.

Figure 2:
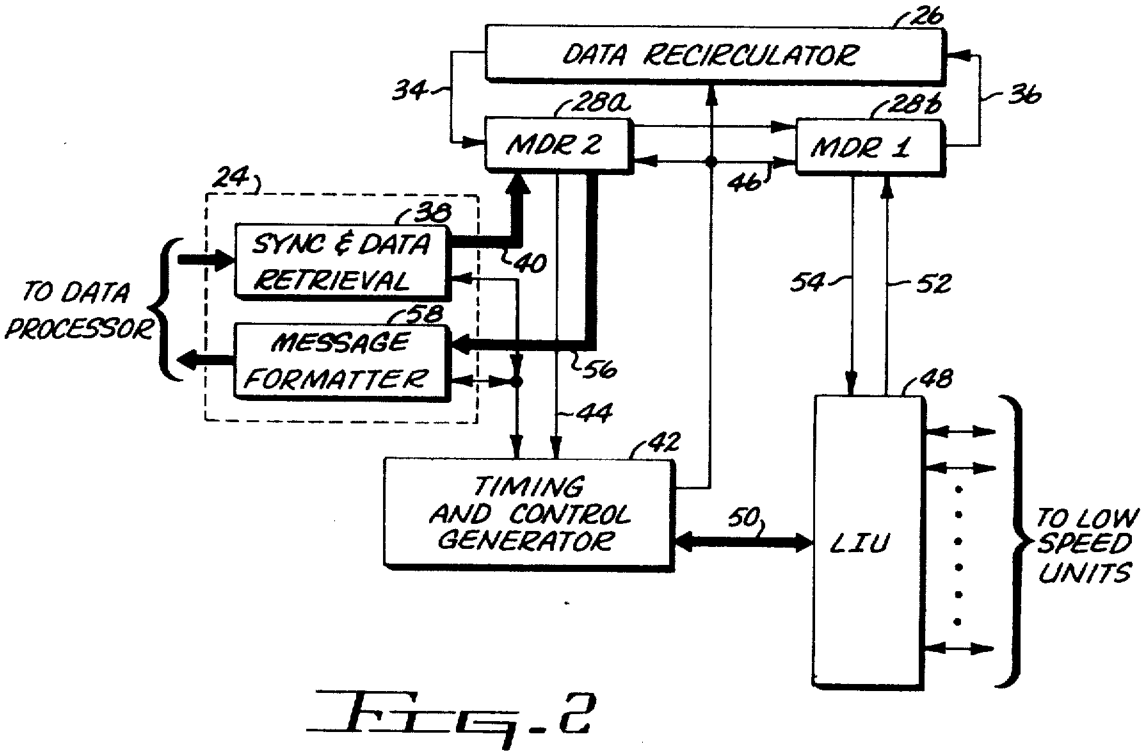
FIG. 2 is a simplified block diagram of a line adaptor utilizing a data recirculator for buffering data items.

Proceeding now with the description of the present invention, a block diagram of the line adapter 14 of FIG. 1 is shown in FIG. 2. The buffer store of the embodiment described is shown comprising a data recirculator 26 and a shift register or memory data register 28. The memory data register 28 is shown comprising two 12-bit shift registers, MDR2 *28a* and MDR1 *28b*. Recirculating data enters MDR2 *28a* of the shift register via a signal line 34 from the data recirculator 26. Data from the shift register 28 is transferred to the data recirculator 26 via a return signal line 36. The memory data register 28 provides the means for altering the data stream as it passes therethrough, i.e., data transferred between the data processor and the low-speed devices is inserted into and extracted from the buffer store via the memory data register 28. The memory data register 28 is thus often termed a window register. Data items received from the data processor via a sync & data retrieval unit 38 of the high-speed interface 24 are transferred parallel-by-character to MDR2 via bus 40. A timing & control generator unit 42 provides timing pulses and control signals to the sync & data retrieval unit 38 and the memory data register 28 for controlling the transfer of the data received from the data processor. The timing and control generator 42 may be of a conventional type which generates the timing or clock pulses in a manner to be described hereinafter, receives control signals from other units in the line adapter and high-speed interface 24, generates control signals at the appropriate time for controlling the internal operations of the line adapter and interface 24, and in response to those internal operations generates other control signals which are transferred to the various components of the line adapter and interface 24. For example, a data item to be transferred to a particular low-speed unit may be identified by a synchronizing signal contained in the data stream passing through MDR2 *28a*. A control signal representative of the identified data item is transferred to the timing & control generator 42 via signal line 44. In response to the control signal, the timing & control generator 42 transmits other appropriately timed control signals to MDR1 via line 46 and to a line interface unit 48 via a bus 50. These control signals effect the transfer of the appropriate data bit from MDR1 to the line interface unit 48 via a line 54, and from the LIU 48 to the appropriate low speed unit. Data from the plurality of low speed units (12, FIG. 1) is transferred in a similar manner via line 52 from the LIU 48 to MDR1 under control of appropriately timed control signals generated in the timing & control generator 42. When a data item from a particular low speed unit is assembled and recirculated through MDR2, the data item is transferred in a character parallel manner from MDR2 via a bus 56 to a message formatter 58 in the high speed interface 24.

Figures 3, 3B:
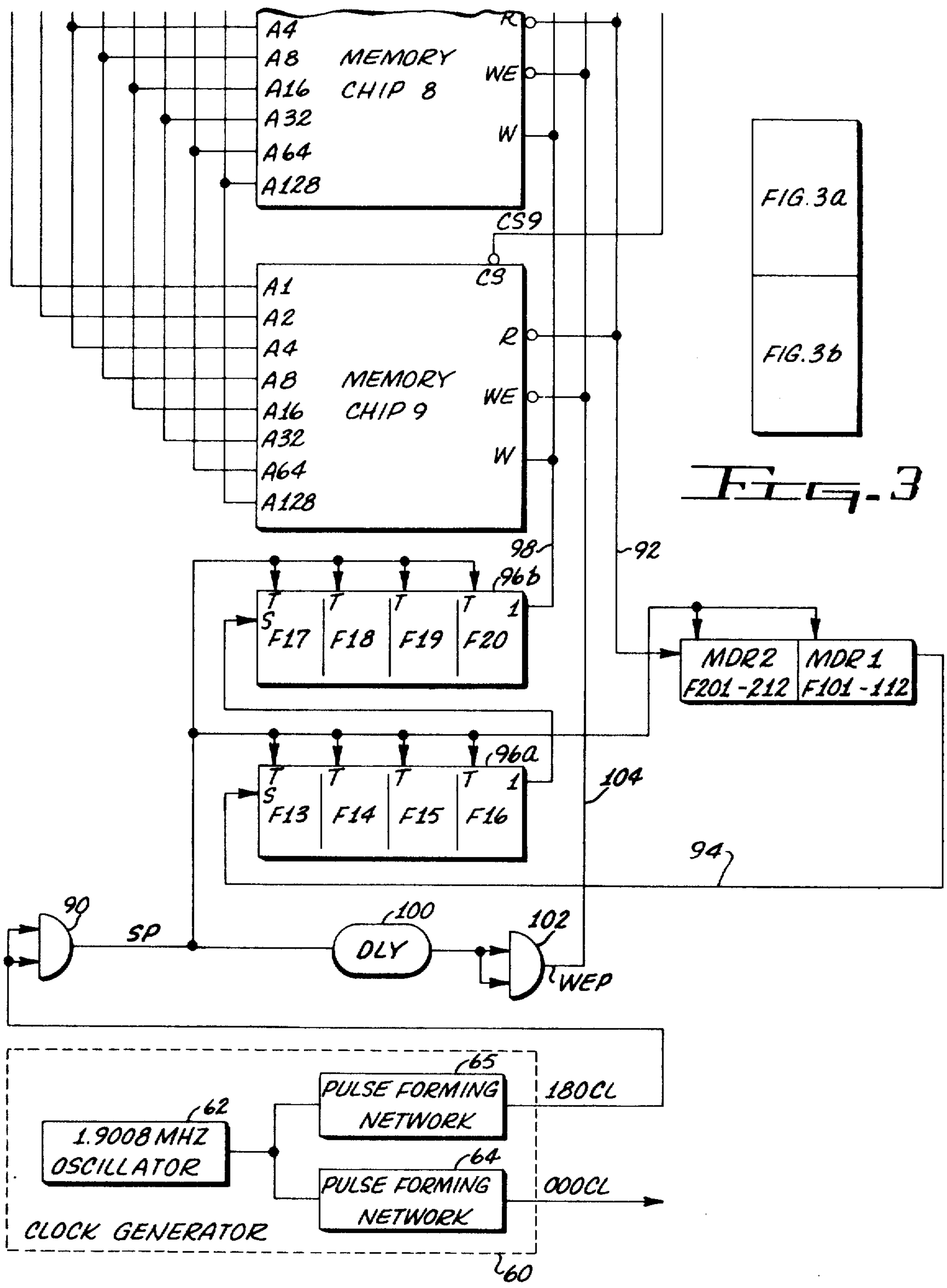
FIGS. 3*a* and 3*b*, arranged as shown in FIG. 3, form a logic diagram of the data recirculator of the present invention.

Referring now to FIG. 3, the data recirculator 26 of FIG. 2 and the associated circuitry will now be discussed in detail. A clock generator 60 (FIG. *3b*), part of the timing & control generator 42 (FIG. 2), produces clock pulses from which all the timing functions for the exemplary system described previously with reference to FIG. 2 are derived. The output of an oscillator 62 is transferred to each of two pulse-forming networks 64 and 65. The pulse-forming networks are each comprised of a monostable circuit and an electronic delay line, and produce a timing pulse of 100 nanoseconds duration, approximately every 526 nanoseconds. Any of the monostable circuits described on pages 146–152 of the aforementioned book by R. K. Richards may be utilized for the pulse-forming networks 64,65. The pulse-forming network 64 produces a 000CL clock pulse; the network 65, a 180CL clock pulse. The 000CL and 180CL clock pulses are displaced each from the other by approximately 263 nanoseconds, as shown on the timing diagram, FIG. 4.

Referring now to FIG. *3a*, the apparatus emulating the prior art delay lines includes a random access memory device, shown here in part, as a memory module 68 labeled memory chip 0. The memory module 68 is representative of a prepackaged, commerically available 256-bit by 1-bit random access memory module, as for example, an Intersil IM5503 16-pin dual-in-line package. The memory module 68 is provided with 8 address input terminals, labeled A1, A2, A4 . . . A128. The number of memory modules provided is arbitrary and dependent on the number of data bits to be recirculated. In the embodiment described, 10 memory modules, labeled memory chip 0–9 are provided for a total storage capacity of 2,560 bits. Several of the ten memory modules have been omitted from FIG. 3 to simplify the drawing.

A eight-bit address counter 70 comprised of bistables F5–F12 is shown on FIG. *3a* as two modules 70*a* and 70*b*, each module having four bistable devices. The 1-output of bistable F5 is bussed to each memory module as the address signal A1; the 1-output of bistable F6 is bussed to each memory module as the address signal A2, etc. The address counter 70, a straight binary counter, thus provides 256 discrete eight-bit address signal groups to each of the 10 memory chips 0–9. Any of the sequential circuit techniques described with reference to FIGS. 3–30, 3–35*b*, 3–36, or 3–37 of the aforementioned book by R. K. Richards may be utilized for the address counter 70.

Each address signal group generated by the address counter 70 is transferred simultaneously to all the memory chips 0–9, consequently, chip-select signals CSO–CS9 are provided by a chip-select counter decode 72. The 000CL clock pulses are transferred through an AND-gate 76, delayed 50 nanoseconds in an electronic delay line 78, and regenerated from AND-gate 80 as CSC chip-select count pulses. The inputs of AND-gates 76 and 80 are tied together; the logic elements are utilized, respectively, for signal isolation and signal regeneration. The CSC pulses are utilized to trigger a chip-select counter 82 comprised of bistables F1–F4. The chip-select counter 82 may be a module similar to or like the binary counter modules 70*a* and 70*b* forming the recirculating address counter 70. The 1-outputs of the chip-select counter 82 are transferred to the chip-select counter decode 72 where the binary count is decoded to produce a discrete chip-select signal. For example, the binary count 1001 is decoded to produce a signal CS9 which is transferred to the CS chip-select input of memory chip 9 (FIG. *3b*). The chip-select counter 82 and decode 72 thus serve to successively select each of the memory chips 0–9, selecting the next chip in sequence upon receipt of the next contiguous CSC pulse. Memory modules are thus sequentially selected each 526.1 nanoseconds, 52.61 microseconds required for selecting the 10 modules of the embodiment described herein. During the 52.61 microsecond selecting period, the same address signal group is applied to all the memory modules.

When a particular memory chip is selected by the application of a chip-select signal to the CS input of the chip, the contents of the memory location addressed by the address lines A1, A2, A4 . . . A128 are transferred to an R-output terminal of the memory chip. The R-output terminals of all the memory chips 0–9 are wire-ORed via a read output bus 92 and transferred to the input of the first stage, bistable F201, of the 12-bit shift register MDR2. Signal isolation may be provided between the R-output terminals and MDR2 by utilizing logic element ORing rather than wire-ORing.

The data item present on the R-output bus 92 is enabled or clocked into MDR2 by a SP shift pulse derived from the 180CL clock pulse. The 180CL clock pulse from the pulse-forming network 65 is applied to both inputs of signal isolation AND-gate 90 and regenerated thereform as the SP shift pulse. The SP pulse is applied to all 12 stages of both MDR2 and MDR1, even though the SP line is shown entering each of the modules MDR2 and MDR1 only once. With each generation of the SP pulse a data bit entering the first stage of MDR2, bistable F201, is shifted right one stage (with relation to FIG. *3b*). Thus, with the generation of 24 SP pulses (approximately 6.15 microseconds) a data item clocked into bistable F201 by the first of the 24 shift pulses, will be clocked into the last stage of MDR1, bistable F112, by the 24th shift pulse. As data items traverse MDR2 and MDR1, they are removed or altered as previously described with reference to FIG. 2. The output of MDR1 bistable F112 is transferred via line 94 to a supplementary shift register 96 comprised of modules 96*a* and 96*b*. The modules 96*a* and 96*b* are comprised, respectively, of bistables F13–F16 and F17–F20. The supplementary shift register 96 is included in the embodiment described to illustrate the point that the total "length" of the data recirculator is arbitrary and may be altered by the addition of supplementary shift register stages. In the embodiment described, a total of 2,592 data bits are circulated through the memory data register MDR2 and MDR1 in approximately 1,364 microseconds. In order to achieve a storage capacity of 2,592 bits, eight bistables are added to supplement the storage capacity of the memory modules (2,560 bits) and the memory data register (24 bits).

The SP shift pulses are applied to bistables F13–F20 each 526 nanoseconds to shift the data sequentially therethrough. The 1-output of the final stage F20 of the supplementary shift register 96 is transferred via a write bus 98 to a W write input terminal of each memory chip 0–9. A WEP write enable pulse is developed by delaying the SP pulse 150 nanoseconds through an electronic delay line 100. The delayed SP pulse issues from a signal-regenerating AND-gate 102 and is transferred via a write enable bus 104 to a WE write enable input terminal of each memory chip 0–9.

Figure 3A:
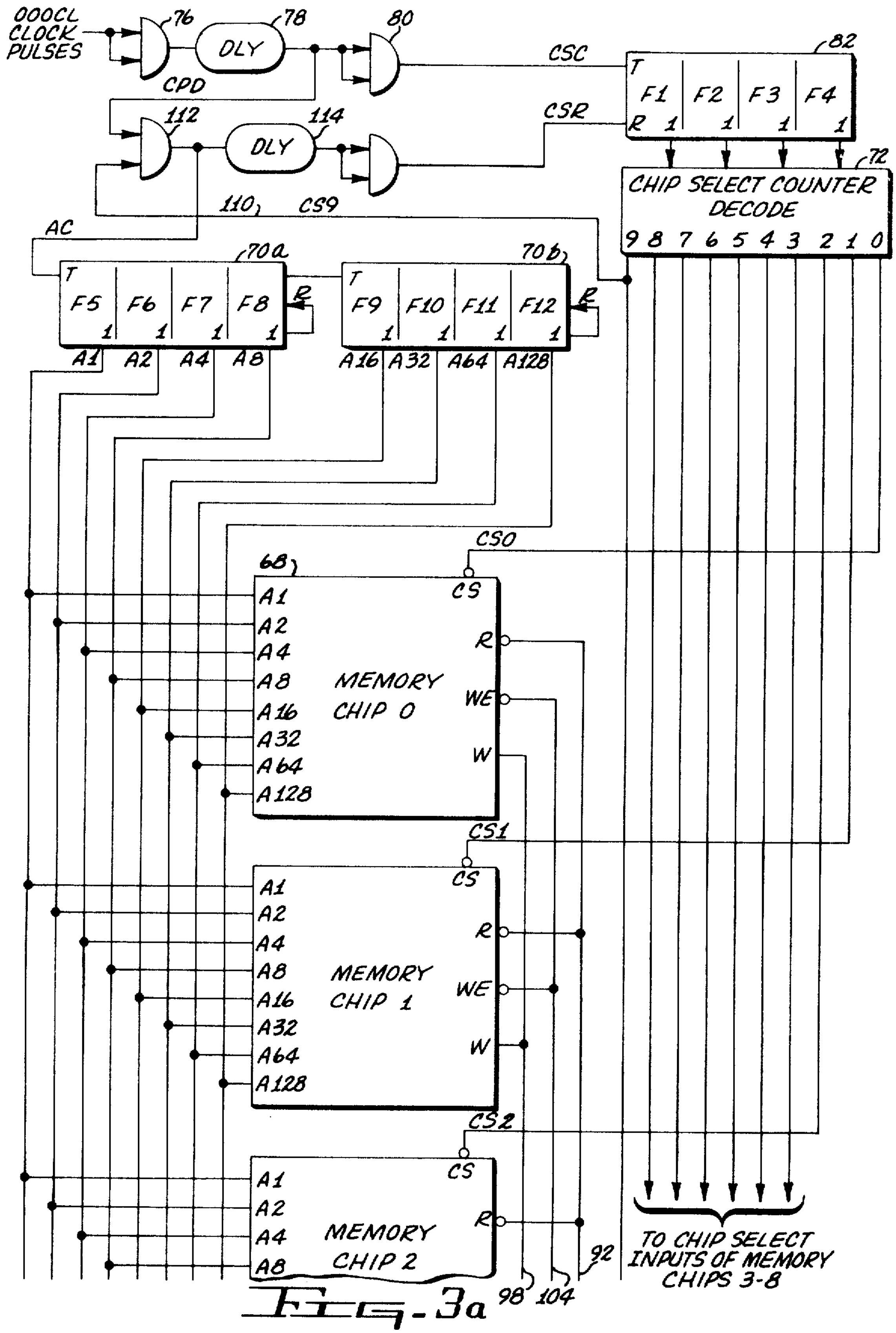
Figure 4:
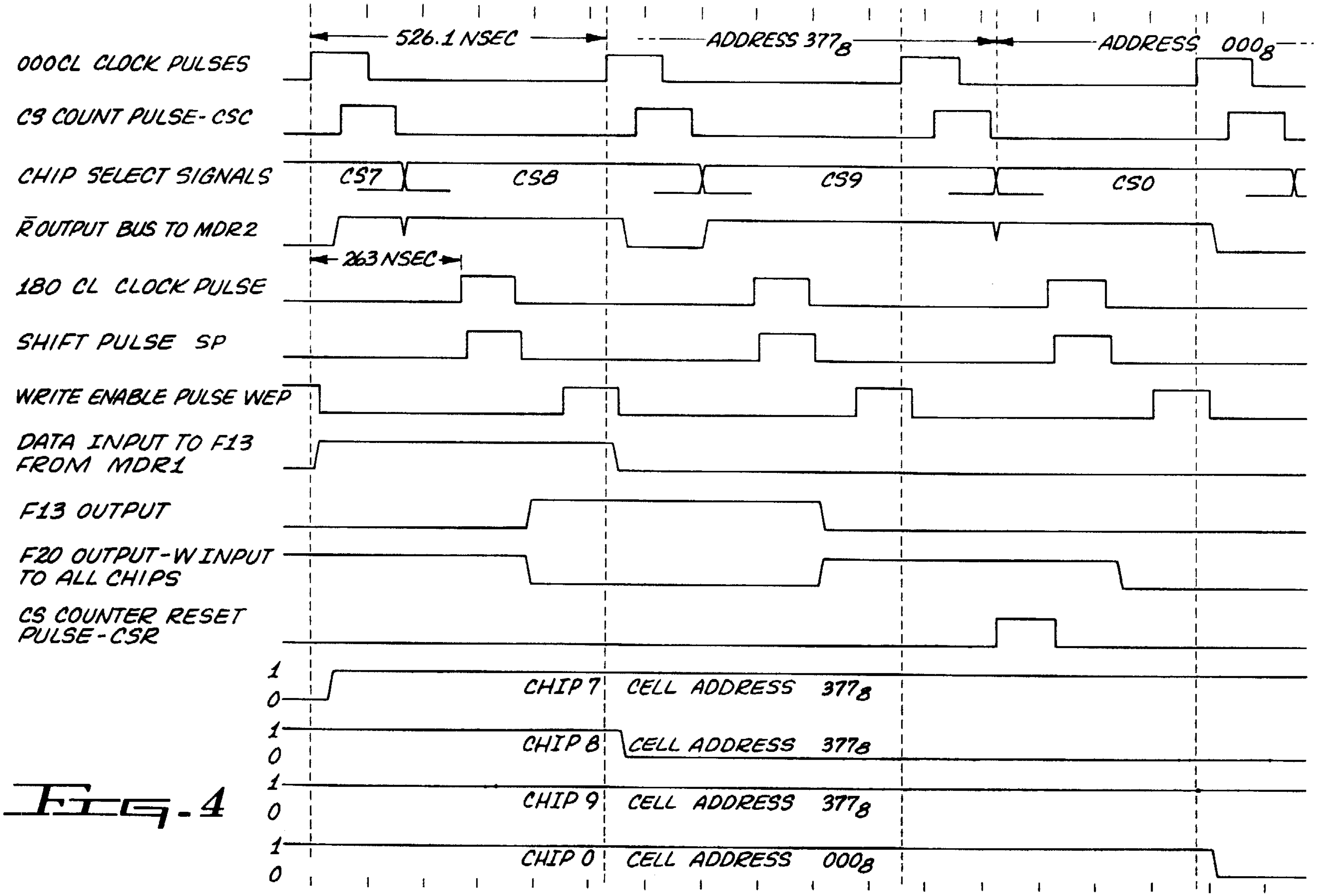
FIG. 4 is a timing diagram depicting the sequence of events occurring during the transfer of data items between the shift register and the recirculator storage devices.

Referring now to FIG. 4 in conjunction with FIGS. 3*a* and 3*b*, the data-transfer sequence will now be described. It is assumed for the purpose of this discussion that the outputs of the recirculating address counter 70 are all enabled, i.e., all address lines A1, A2, A4 . . . A128 are at a high level and address 377 octal is applied to the address terminals of all memory chips 0–9. It is further assumed that the binary signal outputs of the chip-select counter 82 are 0111, therefore, chip-select signal CS7 is enabled as shown on the left-hand portion of the timing diagram, FIG. 4. When the first CSC pulse shown in FIG. 4 issues, chip-select signal CS7 is disabled and signal CS8 is enabled concurrently with the trailing edge of the CSC pulse. When the CS8 chip-select signal is enabled, the output of memory chip 8, cell address 377 octal is impressed on the R-output bus (92 FIG. 3). Since chip 7 and chip 8 both stored a binary 1 in address location 377 octal (lower portion FIG. 4), there is no change reflected on the R-output bus other than a voltage transient as shown on FIG. 4 at the transition from CS7 to CS8. Upon generation of the first 180CL clock pulse shown on FIG. 4, and the SP shift pulse, the contents of chip 8, cell address 377 octal is enabled into MDR2 bistable F201. Concurrently, the SP shift pulse (trailing edge) enables the contents of MDR1 output bistable F112 into bistable F13. The 1-output of bistable F20 is concurrently shown changing from a high level to a low level, assuming that bistable F19 contained a binary zero or a low level prior to the generation of the first SP pulse of FIG. 4. The WEP write enable pulse, delayed 150 nanoseconds from the first SP shift pulse, enables or clocks the contents of bistable F20 into memory chip 8, cell address 377 octal. The change in state is reflected also on the R-output bus from the currently selected chip 8.

With the issuance of the next CSC pulse the CS9 chip-select signal is enabled, and the R-output bus changes again to a high level, reflecting the contents of memory chip 9, cell address 377 octal. Upon issuance of the second SP pulse of FIG. 4, the binary 1 is clocked into MDR2 bistable F201, the output of MDR1 bistable F112, a binary 0, is clocked into bistable F13, and the output of bistable F19 (assumed to be a binary 1) is clocked into bistable F20. The subsequent WEP write enable pulse rewrites a binary 1 into cell address 377 octal of chip 9, thus no change is reflected in the state of that location, as shown in the lower portion of FIG. 4.

The CS9 chip-select signal, see FIG. 3*a*, is transferred via line 110 and applied to one input of an AND-gate 112. When the next 000CL clock pulse issues, it is delayed 50 nanoseconds and applied as a CPD pulse to the other input of the AND-gate 112, enabling the gate. The output of AND-gate 112, an AC address count pulse is applied to the T-input of bistable F5, thus serving to change the output of the recirculating address counter 70 from 377 octal to 000 octal. The AC pulse is delayed 100 nanoseconds by electronic delay line 114, and applied to the R-reset input of the chip-select counter 82 as the CSR chip-select counter reset pulse. The CSR pulse initializes the chip-select counter by resetting bistables F1–F4 to binary 0000, disabling the CS9 signal and enabling the CS0 signal output from the decode 72. The cycling of the memory chips then continues as previously described with reference to address 377 octal for memory chips 0–9.

The voltage transients shown on the R-output bus, see FIG. 4, at the transition from CS7 to CS8, and again at the transition from CS9 to CS0, have no adverse effect upon the operation of my data recirculator as previously described with relation to mechanical delay lines. The pulses transferring data in the present embodiment, viz., the SP and WEP pulses, occur at times when no noise transients are present on the data lines and buses.

From the foregoing detailed description it will be appreciated that the previously stated objects and advantages, as well as others apparent from this specification have been achieved by the embodiment described herein.

Obviously, modifications and variations of my invention are possible in the light of the above teachings. For example, if less than 2,560 bits of storage were required the appropriate address signals could be ANDed with the CS9 signal and the CPD pulse to generate a pulse to reset the address counter 70 to zero. It is threfore understood that my invention may be practiced otherwise than is specifically described and it is intended by the appended claims to cover all such modifications of the invention which fall within the true spirit of the scope of the invention.

What is claimed is:

1. In an apparatus for transferring data between a high-speed device and a plurality of low-speed devices, said apparatus of the type having a recirculating memory with a window shift register for inserting the data into and removing the data from the recirculating memory, an improved data bit recirculator comprising:
   - at least two bit-addressable memory devices;
   - a recirculating counter connected to all of the memory devices for simultaneously addressing a bit location of each of the memory devices;
   - means for successively selecting a different one of the memory devices during successive time periods;
   - means during a particular time period for transferring a data bit from the addressed location of the selected memory device to an input stage of the window register;
   - means following the transfer of the data bit for writing another data bit from an output stage of the window register into the addressed location of the selected memory device;
   - means responsive to the selection of a last one of the memory devices for incrementing the recirculating counter.

2. The apparatus of claim 1 wherein the advancing means is further responsive to the selection of the last memory device to initialize the selecting means.

3. The apparatus of claim 2 wherein the advancing means is further responsive to a particular bit location address to intialize the recirculating counter.

4. A buffer for recirculating data, comprising:
   - a shift register;
   - a plurality of cell-addressable memory devices each having a read output terminal and a write input terminal;
   - a bus connecting each of the read output terminals to an input of the shift register;
   - a second bus connecting the output of the shift register to each of the write input terminals;

a recirculating address counter simultaneously delivering an address signal group representative of a cell to all of the memory devices;

a device-select counter for generating a discrete device-select signal for each of the plurality of memory devices on a one-to-one basis, each of the memory devices responsive to the corresponding device-select signal to enable onto the bus a signal representative of the contents of the addressed cell;

a timing means for advancing the device-select counter during successive time periods to generate a plurality of the device-select signals, said timing means further providing a shift pulse enabling the transfer of the contents of the addressed cell from the bus to the shift register, said timing means further providing subsequent to the shift pulse a write enable pulse enabling the transfer of an output signal from the second bus to the addressed cell; and means responsive to the timing means and following the generation of the plurality of device-select signals for incrementing the recirculating address counter to deliver another address signal group, said advancing means further operative to reset the device-select counter.

5. The buffer as claimed in claim 4 wherein the advancing means if further responsive to a particular address signal group to initialize the recirculating address counter.

* * * * *

UNITED STATES PATENT OFFICE

CERTIFICATE OF CORRECTION

Patent No. 3,755,788 Dated August 28, 1973

Inventor(s) DeVer Charles Finch

It is certified that error appears in the above-identified patent and that said Letters Patent are hereby corrected as shown below:

Claim 2, Column 8, Line 53, change "advancing" to --incrementing--.

Claim 3, Column 8, Line 55, change "advancing" to --incrementing--.

Signed and sealed this 19th day of March 1974.

(SEAL)
Attest:

EDWARD M.FLETCHER,JR.
Attesting Officer

C. MARSHALL DANN
Commissioner of Patents

USCOMM-DC 60376-P69
☆ U.S. GOVERNMENT PRINTING OFFICE : 1969 O—366-334.